United States Patent
Yang (10) Patent No.: US 11,064,259 B2
(45) Date of Patent: Jul. 13, 2021

(54) INTERACTION DATA DISTRIBUTION CONTROL METHOD, APPARATUS, ELECTRONIC DEVICE, AND STORAGE MEDIUM

(71) Applicant: Beijing Bytedance Network Technology Co., Ltd., Beijing (CN)

(72) Inventor: Yemeng Yang, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/015,197

(22) Filed: Sep. 9, 2020

(65) Prior Publication Data

US 2020/0404381 A1 Dec. 24, 2020

Related U.S. Application Data

(63) Continuation of application No. PCT/CN2019/122101, filed on Nov. 29, 2019.

(30) Foreign Application Priority Data

Dec. 29, 2018 (CN) .......................... 201811643602.3

(51) Int. Cl.
*H04N 21/4788* (2011.01)
*H04N 21/2187* (2011.01)
(Continued)

(52) U.S. Cl.
CPC ..... *H04N 21/4788* (2013.01); *H04N 21/2187* (2013.01); *H04N 21/23614* (2013.01); *H04N 21/4882* (2013.01)

(58) Field of Classification Search
CPC ........... H04N 21/4788; H04N 21/2187; H04N 21/23614; H04N 21/4882; H04N 21/47; H04L 67/22; H04L 51/046; H04L 65/00
See application file for complete search history.

(56) References Cited

U.S. PATENT DOCUMENTS 10,348,795 B2 * 7/2019 Payzer ................... G06F 13/38
2011/0122246 A1 5/2011 Beattie et al.
(Continued)

FOREIGN PATENT DOCUMENTS

CN 106161219 A 11/2016
CN 106302463 A 1/2017
(Continued)

OTHER PUBLICATIONS

International Patent Application No. PCT/CN2019/122101; Int'l Search Report; dated Jan. 22, 2020; 2 pages.

*Primary Examiner* — Ngoc K Vu
(74) *Attorney, Agent, or Firm* — BakerHostetler (57) ABSTRACT

The present disclosure discloses an interaction data distribution control method, apparatus, device, and storage medium. The method includes: determining a maximum amount of interaction data distributed to each client within a set time based on a time interval for processing the interaction data of each client, wherein the interaction data is data that a user interacts with a live broadcast display interface of the client; distributing linkage interaction data to each client, wherein the linkage interaction data is used to indicate each client that receives the linkage interaction data to generate a matched interaction response, and the linkage interaction data is not greater than the maximum amount of the interaction data, and the matched interaction response is an interaction response generated by each client based on the linkage interaction data.

18 Claims, 7 Drawing Sheets

(51) Int. Cl.
*H04N 21/236* (2011.01)
*H04N 21/488* (2011.01)

(56) References Cited

U.S. PATENT DOCUMENTS

2015/0346955 A1* 12/2015 Fundament ........ H04N 21/4821
                                                         715/765
2017/0171267 A1*  6/2017 Cornell .................. G06Q 10/00
2018/0035169 A1   2/2018 Zheng et al.
2018/0295069 A1* 10/2018 Smith ................. H04L 65/4092

FOREIGN PATENT DOCUMENTS

| CN | 107635155 A | 1/2018 |
| CN | 108156148 A | 6/2018 |
| CN | 108512938 A | 9/2018 |
| CN | 108668147 A | 10/2018 |
| CN | 108924661 A | 11/2018 |
| WO | WO 2005/067475 A2 | 7/2005 |

* cited by examiner

INTERACTION DATA DISTRIBUTION CONTROL METHOD, APPARATUS, ELECTRONIC DEVICE, AND STORAGE MEDIUM

CROSS REFERENCE OF RELATED APPLICATIONS

The disclosure is a continuation of PCT International Application No. PCT/CN2019/122101, filed Nov. 29, 2019, which claims the priority of the Chinese patent application No. 201811643602.3 filed on Dec. 29, 2018 at China National Intellectual Property Administration, the entire contents of which are incorporated herein by reference.

TECHNICAL FIELD

Embodiment of the present disclosure relates to live broadcast technology, and in particular to interaction data distribution control method, apparatus, electronic device, and storage medium.

BACKGROUND

With the development of live broadcast software, live broadcast has gradually become a way of obtaining information that is popular among users. In live broadcasting, the client of the anchor (referred to as the anchor) can live broadcast to the user through the live broadcast software. The user can interact with the anchor through the client on the user side.

When the user interacts with the anchor, the user can operate the live broadcast display interface, the user client generates interaction data, and the user client generates an interaction response (which can be displayed locally on the user client) and processes the interaction data to Send the processed interaction data to the server, and the server transmits the interaction data (for example, the interaction data from the user client and other clients) to each client, so that each client generates an interaction response and displays it based on the received interaction data. Among them, the server can receive interaction data sent by multiple clients; when the server receives a large amount of interaction data sent by each client, the interaction data distributed to each client will also be large, and each client needs to perform a lot of data processing. It is also easy to cause the accumulation of interaction data, the client cannot display the interaction response in real time, and occupy various resources of the client.

SUMMARY

The embodiment of the present disclosure provides an interaction data distribution control method, apparatus, electronic device, and storage medium, which can reduce the pressure on the data processing of the client, avoid the accumulation of interaction data, enable the client to display the interaction response in real time, and save the memory of the client.

According to a first aspect of the present disclosure, the embodiment of the present disclosure provides an interaction data distribution control method, including:
determining a maximum amount of interaction data distributed to each client within a set time based on a time interval for processing the interaction data of each client, wherein the interaction data is data that a user interacts with a live broadcast display interface of the client;
distributing linkage interaction data to each client, wherein the linkage interaction data is used to indicate each client that receives the linkage interaction data to generate a matched interaction response, and the linkage interaction data is not greater than the maximum amount of the interaction data, and the matched interaction response is an interaction response generated by each client according to the interaction data transmitted by other clients in the linkage interaction data.

According to a second aspect of the present disclosure, the embodiment of the present disclosure provides an interaction data distribution control apparatus, including:
a determining module configured to determine a maximum amount of interaction data distributed to each client within a set time based on a time interval for processing the interaction data of each client, wherein the interaction data is data that a user interacts with a live broadcast display interface of the client:
a distributing module configured to distribute linkage interaction data to each client, wherein the linkage interaction data is used to indicate each client that receives the linkage interaction data to generate a matched interaction response, and the linkage interaction data is not greater than the maximum amount of the interaction data, and the matched interaction response is an interaction response generated by each client based on the linkage interaction data.

According to a third aspect of the present disclosure, the embodiment of the present disclosure provide an electronic device, including:
one or more processors;
a storage storing one or more programs,
when the one or more programs are executed by the one or more processors, the one or more processors implement an interaction data distribution control method provided by the embodiment of the present disclosure.

According to a fourth aspect of the present disclosure, the embodiment of the present disclosure provides a computer-readable storage medium on which a computer program is stored, when the computer program is executed by a processor, an interaction data distribution control method provided by the embodiment of the present disclosure is implemented

DETAILED DESCRIPTION OF EMBODIMENTS

The disclosure will be further described in detail below with reference to the drawings and embodiment. It can be understood that the specific embodiment described herein is only used for explaining the present disclosure, rather than limiting the present disclosure. In addition, it should be noted that, for ease of description, the drawings only show part and not all structures related to the present disclosure.

Figure 1:
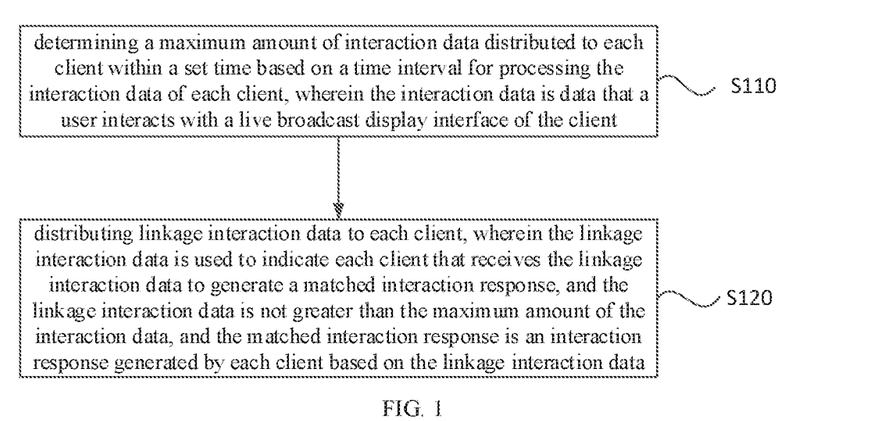
FIG. 1 is a flowchart of an interaction data distribution control method provided by one or more embodiments of the present disclosure.

FIG. 1 is a flowchart of an interaction data distribution control method provided by one or more embodiments of the present disclosure. The method is executed by an interaction data distribution control device which is implemented by software and/or hardware and can be provided in a server.

Optionally, the method provided by the embodiment of the present disclosure may be applied in a live broadcast scenario. Optionally, the method can be applied in a scenario where the user interacts with the live broadcast display interface at a high frequency and for a long time. Optionally, the method can be applied to a scenario where a user long presses a control on a live broadcast display interface in a live broadcast room to express strong emotions. Wherein, when the user long presses the control on the live broadcast display interface, the user's client can generate more interaction data locally, thereby generating more interaction responses based on the interaction data, so that strong emotions of user are expressed by displaying more interaction responses locally at the client. Wherein, the frequency of interaction between the user and the live broadcast display interface is greater than the set frequency value. Wherein, the set frequency value can be set as needed.

In one or more embodiments of the present disclosure, when a user interacts with an anchor, the user can operate the live broadcast display interface, the interaction data is generated by the user's client, and an interaction response is generated locally on the user's client, and the interaction response is displayed and the interaction data is processed to transmit the processed interaction data to the server; the server transmits the interaction data to each client, so that each client generates an interaction response and displays it based on the received interaction data. Wherein, when the user long presses the control on the live broadcast display interface at the local client, or the control on the live broadcast display interface is performed in high frequency, the server can receive more interaction data transmitted by the client; when the server receives a large amount of interaction data transmitted by each client, the amount of the interaction data distributed to each client will also be large, which is easy to cause the accumulation of interaction data, and processing a large amount of interaction data occupies various resources when displayed on the client. The technical solution provided by the embodiment of the present disclosure controls a maximum amount of interaction data distributed to each client within a unit time based on a time interval for processing the interaction data of each client, which can pressure on the data processing of the client, avoid the accumulation of interaction data, and save the memory of the client.

As shown in FIG. 1, the technical solutions provided by the embodiments of the present disclosure include:

S110: determining a maximum amount of interaction data distributed to each client within a set time based on a time interval for processing the interaction data of each client, wherein the interaction data is data that a user interacts with a live broadcast display interface of the client.

In the embodiment, when a user interacts with an anchor, the user can operate the live broadcast display interface, and the interaction data is generated by the user's client, an interaction response is generated locally, and is displayed; and the interaction data is stored, when the data reporting conditions are met, the stored interaction data is transmitted to the server, for example, the stored interaction data can be transmitted to the server every preset time interval. For example, the client may transmit the stored interaction data to the server every 1 s, where the stored interaction data may be: a combination of type information and amount, for example, the form of the stored interaction data may be [Type2, Count2], which indicates that there are two interaction data of type 2. When the client caches the interaction data, if it is determined that the cache area includes a target cache data with the same type as the interaction data, the interaction data and the target cache data are combined and cached, for example, the amount of target cache data is increased by one, and the interaction data is discarded. If it is determined that the cache area does not include the target cache data with the same type as the interaction data, the interaction data is stored in the cache area. For example, it is assumed that the cached data in the cache area includes 3A, 2B and 4C. If the type of interaction data is A, the client detects whether the cached data in the cache area contains cached data of type A. After detecting that there is cached data of type A in the cache area, that is the cached data is 3A, then the amount of 3A is added by one, that is, the cached data is 4A, and then the interaction data A is discarded, and the cached data in the cache area finally includes 4A, 2B, and 4C.

For another example, it is assumed that the cached data in the cache area includes: 3A, 2B, and 4C. If the type of the acquired interaction data is D, the client detects that the cached data in the cache area does not include the cached data of type D, and then the interaction data is cached in the cache area, and the cache form is 1D. The final cached data in the cache area includes: 3A, 2B, 4C and 1D. Thus, by caching the interaction data, the cache space can be saved, and multiple small data can be integrated into a data set, which can reduce the transmitted data, improve the transmission efficiency, and reduce the transmission frequency.

Therefore, by storing interaction data and reporting the stored interaction data to the server every preset time, the client can reduce the occupation of network broadband and avoid an over-consumption on the resource of the server, with respect to the situation in which it is immediately reported as long as the interaction data is generated.

In the embodiment, the server may receive interaction data transmitted by at least one client. Wherein, at least one client refers to a client that generates interaction data, and a client that does not generate interaction data may not transmit the interaction data to the server. The server may distribute the received interaction data to each client, wherein the server determines the maximum amount of interaction data to be distributed to each client within a set time based on the time interval of interaction data processing.

In the embodiment, the interaction response may be an animation. The time interval for interaction data processing can be set in advance, and the time interval for interaction data processing can be understood as the time interval related to the interaction response. Since the interaction response needs to be displayed immediately when generated, the time interval for interaction data processing can be set reasonably according to the experience of most users watching interaction responses. for example, it can be set according to the best display effect of most users watching the interaction response. Or the time interval for interaction data processing may be determined according to the minimum time required for interaction data processing, or may be determined according to various resources of the client or other hardware factors of the client. For example, the time interval for interaction data processing on client may be a time interval for the client to periodically process the interaction data according to a specific scheme; or, in the case where the cycle of client refreshing and/or displaying the interaction response in each client can achieve the best display effect, the time interval can be the period; or in the case where the minimum time for the client to process interaction data is 1 second, the time interval can be set to 1 second according to the minimum time; the above setting mode is just an example, those skilled in the art can set the time interval according to specific application scenarios. The time interval of interaction data processing may be 150 milliseconds or 50 milliseconds. The set time may be a unit time, for example, it may be 1 s.

In an embodiment of the present disclosure, optionally, determining a maximum amount of interaction data distributed to each client within a set time based on a time interval for processing the interaction data of each client, including: determining the maximum amount based on the following formula:

$$N_{max} \leq \frac{S}{\Delta T},$$

Where, $N_{max}$ is the maximum number; S is the set time; $\Delta T$ is the time interval. For example, if the set time is 1 s and the time interval of interaction data processing is 150 milliseconds, the maximum amount of the interaction data distributed to each client determined by the server is 6. If the set time is 1 s and the time interval of interaction data processing is 50 milliseconds, the maximum amount of the interaction data distributed to each client determined by the server is 20.

Thus, controlling the maximum amount of interaction data distributed to each client within a set time by the time interval of interaction data processing, which can reduce the pressure of data processing on client, avoid the accumulation of interaction data, and save various resources of the client.

S120: distributing linkage interaction data to each client, wherein the linkage interaction data is used to indicate each client that receives the linkage interaction data to generate a matched interaction response, and the linkage interaction data is not greater than the maximum amount of the interaction data, and the matched interaction response is an interaction response generated by each client according to the interaction data transmitted by other clients in the linkage interaction data.

In the embodiment, the server distributes the linkage interaction data to each client within a set time, where the linkage data is composed of interaction data of which the amount is not greater than the maximum amount, so that each client that received the linkage interaction data generates a matched interaction response. Optionally, the matched interaction response is an interaction response generated by each client according to the interaction data transmitted by other clients in the linkage interaction data, or an interaction response generated by the client according to the interaction data transmitted by each client in the linkage interaction data. Wherein, for the method of the server distributing the interaction data to each client within each set time, please refer to the above method for transmitting the interaction data within the set time, wherein the server can distribute interaction data of which the amount is not greater than the maximum amount to each client at one time within each set time.

Wherein, each client can generate a matched interaction response according to the received linkage interaction data and display it. Optionally, each client can generate a matched animation according to the received linkage interaction data. Wherein, the linkage interaction data is not greater than the maximum amount of the interaction data, and each client can generate an animation based on the interaction data transmitted by other clients. The interaction data may also include client identification information or user identification information. When each client receives the linkage interaction data, it may compare the client identification information or user identification information of each interaction data in the linkage interaction data. If the client determines that the client identification information in the interaction data is different from the local client identification information, or if the user identification information in the interaction data is different from the user identification information logged into the local client, then an animation is generated according to the interaction data. In one or more embodiments of the present disclosure, the process for the client to process the interaction data and generate the animation may be: the client receives the linkage interaction data, where the interaction data in the linkage interaction data may form a data queue, and the client reads and processes a piece of interaction data in the data queue per a preset interval. In one or more embodiments of the present disclosure, the client may randomly generate an animation path every preset time interval, read an interaction data in the data queue, and determine the interaction response based on the read interaction data (for example, an animation object), play the animation object along the animation path. The preset time interval is the time interval for interaction data processing. The animation object may be an emoji object, a like object, or other objects. Emoji object can be smiling faces or crying faces.

Optionally, when a preset type control on the live broadcast display interface is performed by the user, interaction data is generated, so that the interaction data may also include type information corresponding to the identification information of the control which is performed. The server obtains the linkage interaction data according to the received interaction data, so the linkage interaction data includes type information corresponding to the identification information of the control which is performed; each client receives the linkage interaction data transmitted by the server, and can determine the identification information of the control which is performed according to the type information, so that determine the animation object corresponding to the identification information of the control, and the animation object can be played along the animation path, thereby an interaction response that matches the type information in the interaction data is obtained. In this way, when the client transmits the interaction data including the identification information of the control which is performed to the server and the server transmits the linkage interaction data generated according to the interaction data to each client, then each client determines a matched interaction response according to the type information, the interaction response viewed by other users can be consistent with the interaction response lighted by the user, which ensures the consistency of the interaction response on local and on other clients, and meets the needs of users to express their emotions. The technical solution provided by the present disclosure controls the maximum amount of interaction data distributed to each client within a set time through the time interval of interaction data processing, which can reduce the pressure of client data processing, avoid accumulation of interaction data, and save various resources of the client.

Figure 2:
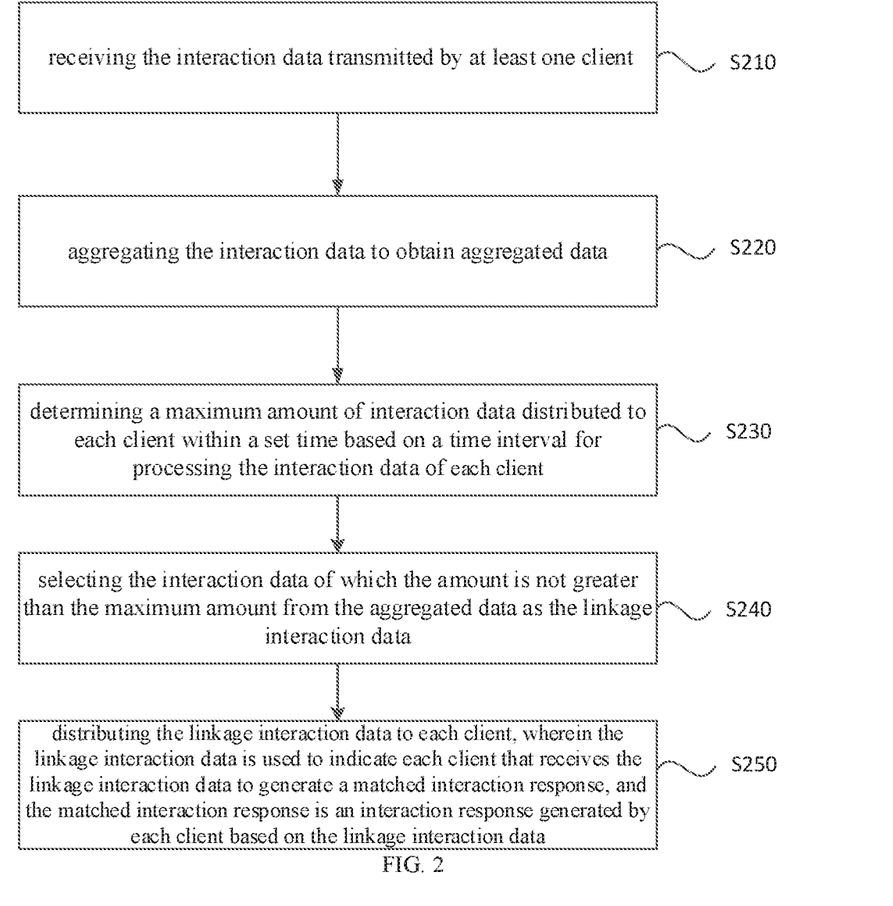
FIG. 2 is a flowchart of an interaction data distribution control method provided by one or more embodiments of the present disclosure.

FIG. 2 is a flowchart of an interaction data distribution control method provided by one or more embodiments of the present disclosure. In the embodiment, optionally, the method may further include:

receiving the interaction data transmitted by at least one client, where the interaction data is an interaction data that a user interacts with a live broadcast display interface of the client; aggregating the interaction data to obtain aggregated data; and selecting interaction data from the aggregated data as linkage interaction data; distributing the linkage interaction data to each client, and the linkage interaction data is used to indicate each client that receives the linkage interaction data to generate a matched interaction response, and displaying the matched interaction response.

By aggregating the received interaction data and selecting the linkage interaction data, (for example, selecting the interaction data of which the amount is not greater than a preset number or preset ratio) as linkage interaction data, and distributing the linkage interaction data to each client, the server can reduce the amount of the interaction data distributed to the client, reduce the pressure on the data processing, and avoid the delay of interaction response.

In the following, taking the selecting the interaction data of which the amount is not greater than a preset number as linkage interaction data as an example, the solution of the embodiment of the present disclosure will be described. The embodiment may include the following steps: receiving the interaction data transmitted by at least one client:
aggregating the interaction data to obtain aggregated data:
selecting the interaction data of which the amount is not greater than the maximum amount from the aggregated data as the linkage interaction data.

As shown in FIG. 2, the technical solutions provided by the embodiments of the present disclosure include:

S210: receiving the interaction data transmitted by at least one client.

In the embodiment, when the user interacts with the anchor, the user can operate the live broadcast display interface to generate an interaction data by the user's client. An interaction response is generated locally on the client, and is display; and the interaction data is stored, the stored interaction data is transmitted to the server every preset time. For example, the client may transmit the stored interaction data to the server every 1 s, where the stored interaction data may be: a combination of type and amount, for example, the form of the stored interaction data may be [Type2, Count2], which indicates that there are two Interaction data of type 2. Therefore, by storing interaction data and reporting the stored interaction data to the server every preset time, the client can reduce the occupation of network broadband and avoid over consume the resources of the server, comparing with the situation of immediately reporting as long as the interaction data is generated.

Where, the server can receive the interaction data transmitted by at least one client. Where, the at least one client refers to a client that generates interaction data, and a client that does not generate interaction data may not transmit the interaction data to the server.

S220: aggregating the interaction data to obtain aggregated data.

S230: determining a maximum amount of interaction data distributed to each client within a set time based on a time interval for processing the interaction data of each client.

S240: selecting the interaction data of which the amount is not greater than the maximum amount from the aggregated data as the linkage interaction data.

In the embodiment, the server aggregates the received interaction data to obtain the aggregated data, and can randomly select interaction data whose amount is no more than the maximum amount, or can scale the various types of interaction data in the aggregated data in proportion to the amount, or can select, using other mode, interaction data whose amount is no more than the maximum amount as linkage interaction data. Wherein, when the various types of interaction data are scaled proportionally according to the amount, the amount of various types of interaction data can be scaled according to the same or similar proportions (for example, within a certain proportional range).

Therefore, the server can reduce the amount of interaction data distributed to each client, reduce the pressure on the data processing of each client, and avoid interaction response delay by selecting the received interaction data whose amount is no more than the maximum amount.

S250: distributing the linkage interaction data to each client, wherein the linkage interaction data is used to indicate each client that receives the linkage interaction data to generate a matched interaction response, and the matched interaction response is an interaction response generated by each client based on the linkage interaction data.

It should be noted that, in the interaction data distribution control method provided in the embodiment, the execution order between the steps is not limited to the above-mentioned order, where S230 may also be executed before S220, or S230 may also be executed before S210.

Figure 3A:
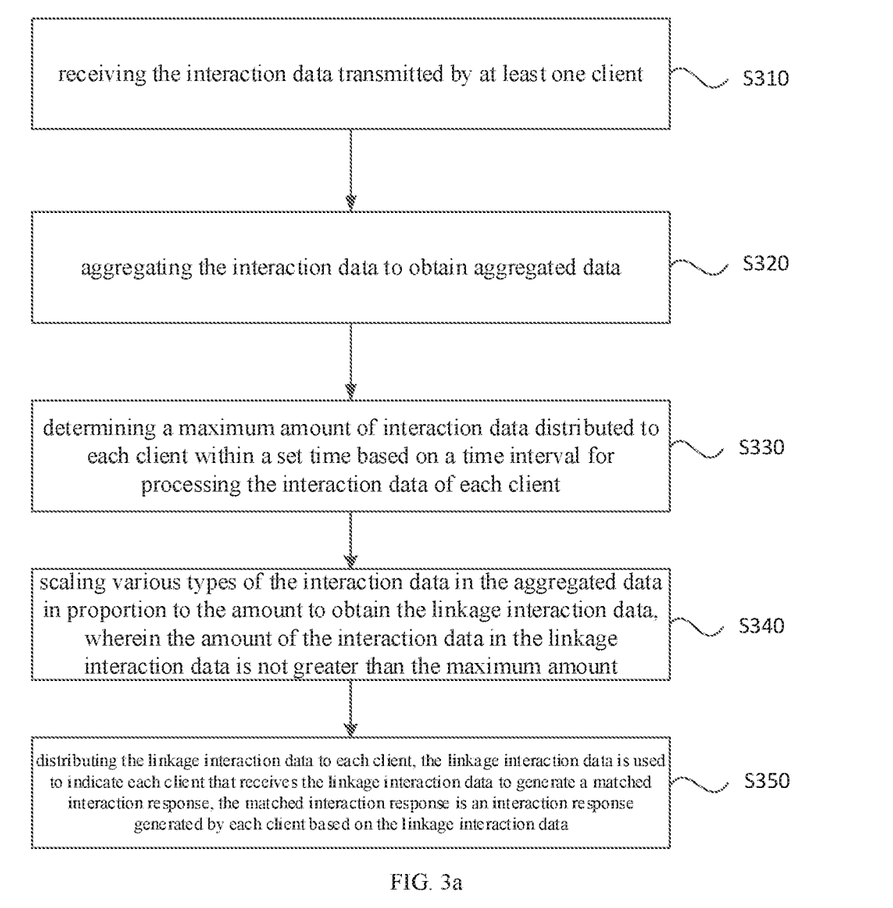
FIG. 3a is a flowchart of an interaction data distribution control method provided by one or more embodiments of the present disclosure.

FIG. 3a is a flowchart of an interaction data distribution control method provided by one or more embodiments of the present disclosure. The solutions of this embodiment can be combined with various optional solutions in one or more embodiments described above. In the embodiment, optionally.

The selecting the interaction data of which the amount is not greater than the maximum amount from the aggregated data as the linkage interaction data can include:
scaling various types of the interaction data in the aggregated data in proportion to the amount to obtain the linkage interaction data, wherein the amount of the interaction data in the linkage interaction data is not greater than the maximum amount.

As shown in FIG. 3a, the technical solutions provided by the embodiments of the present disclosure include:

S310: receiving the interaction data transmitted by at least one client.

S320: aggregating the interaction data to obtain aggregated data.

S330: determining a maximum amount of interaction data distributed to each client within a set time based on a time interval for processing the interaction data of each client.

Wherein the interaction data is data that a user interacts with a live broadcast display interface of the client.

S340: scaling various types of the interaction data in the aggregated data in proportion to the amount to obtain the linkage interaction data, wherein the amount of the interaction data in the linkage interaction data is not greater than the maximum amount.

In the embodiment, the aggregated data may include at least one type of interaction data. Wherein, the type of interaction data can be determined by the controls on the live broadcast display interface triggered by the user. For example, if the user triggers the control A on the live broadcast display interface, the generated interaction data may be 1, if the user triggers the control B on the live broadcast display interface, the generated interaction data may be 2. Since the controls triggered by the user are different, the types of interaction data generated are also different.

In the embodiment, the scaling various types of the interaction data in the aggregated data in proportion to the amount results an integer. For example, the amount of interaction data of type "2" in the aggregated data is 15, if the proportional scaling is 5 times, three interaction data of type "2" are obtained.

S350: distributing the linkage interaction data to each client. The linkage interaction data is used to indicate each client that receives the linkage interaction data to generate a matched interaction response. The matched interaction response is an interaction response generated by each client based on the linkage interaction data.

Figure 3B:
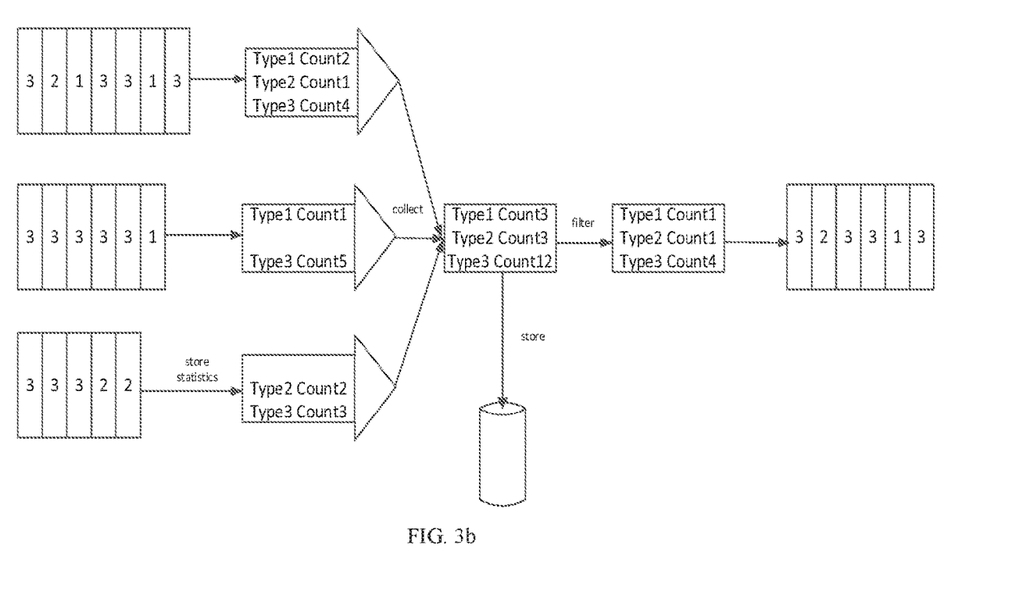
FIG. 3b is a schematic diagram of interaction data distribution control provided by one or more embodiments of the present disclosure.

For example in the embodiment, as shown in FIG. 3b, there are three clients that transmit interaction data to the server. Among them, the interaction data generated by the first client are "3,2,1,3,3,1,3", and the format that the first client stores the interaction data can be $$\begin{bmatrix} \text{Type1} & \text{Count2} \\ \text{Type2} & \text{Count1} \\ \text{Type3} & \text{Count4} \end{bmatrix},$$

which indicating that the amount of interaction data of type 1 is 2, the amount of interaction data of type 2 is 1, the amount of interaction data of type 3 is 4. The interaction data generated by the second client are "3, 3, 3, 33, 1", and the format that the second client stores the interaction data can be $$\begin{bmatrix} \text{Type1} & \text{Count1} \\ \text{Type3} & \text{Count5} \end{bmatrix}.$$

The interaction data generated by the third client is "3, 3, 3, 2, 2", and the format that the third client stores the interaction data can be $$\begin{bmatrix} \text{Type2} & \text{Count2} \\ \text{Type3} & \text{Count3} \end{bmatrix}.$$

All three clients transmit the stored interaction data to the server. The server aggregates the received interaction data. The aggregated data can be expressed as follows $$\begin{bmatrix} \text{Type1} & \text{Count3} \\ \text{Type2} & \text{Count3} \\ \text{Type3} & \text{Count12} \end{bmatrix}.$$

If the time interval for the interaction data processing of the three clients is 150 milliseconds, the server determines that the maximum amount of interaction data transmit to each client is 6 per second. Therefore, the server can select out 6 interaction data, and the server scales the interaction data of each type in the aggregated data by 3 times in proportion to obtain the linkage interaction data, where the linkage interaction data includes interaction data of which the amount is not greater than the maximum amount. The linkage interaction data is aggregated as follows:

$$\begin{bmatrix} \text{Type1} & \text{Count1} \\ \text{Type2} & \text{Count1} \\ \text{Type3} & \text{Count4} \end{bmatrix}.$$

The server distributes and selects out the linkage interaction data to each client in 1 s, wherein the linkage interaction data distributed to each client may be: 3, 2, 3, 3, 1, 3, respectively. At other times, the method for the server to distribute linkage interaction data to each client is the same as the method described above. The amount of interaction data that the server can distribute to each client per second does not exceed 6.

As a result, the server aggregates the received interaction data to obtain aggregated data, and scales the various types of interaction data in the aggregated data in proportion to the amount, so that each type of interaction data can be controlled in a balanced manner, therefore, the obtained interaction data corresponds to the real situation in the live broadcast room, the interaction data distributed to each client corresponds to the real situation in the live broadcast room, so as to the real situation in the live broadcast room may be restored as much as possible for the case of triggering multiple controls, the consistency of the overall atmosphere in the live broadcast room is ensured; by controlling the maximum amount of interaction data distributed to each client within a set time, the amount of interaction data distributed to each client can be reduced, the pressure on the data processing of each client can be reduced, the problem of delay in interaction response can be avoided, and the accumulation of the interaction data of client can be avoided, the interaction response can be displayed by the client in real time, various resources of the client can be saved.

Figure 4:
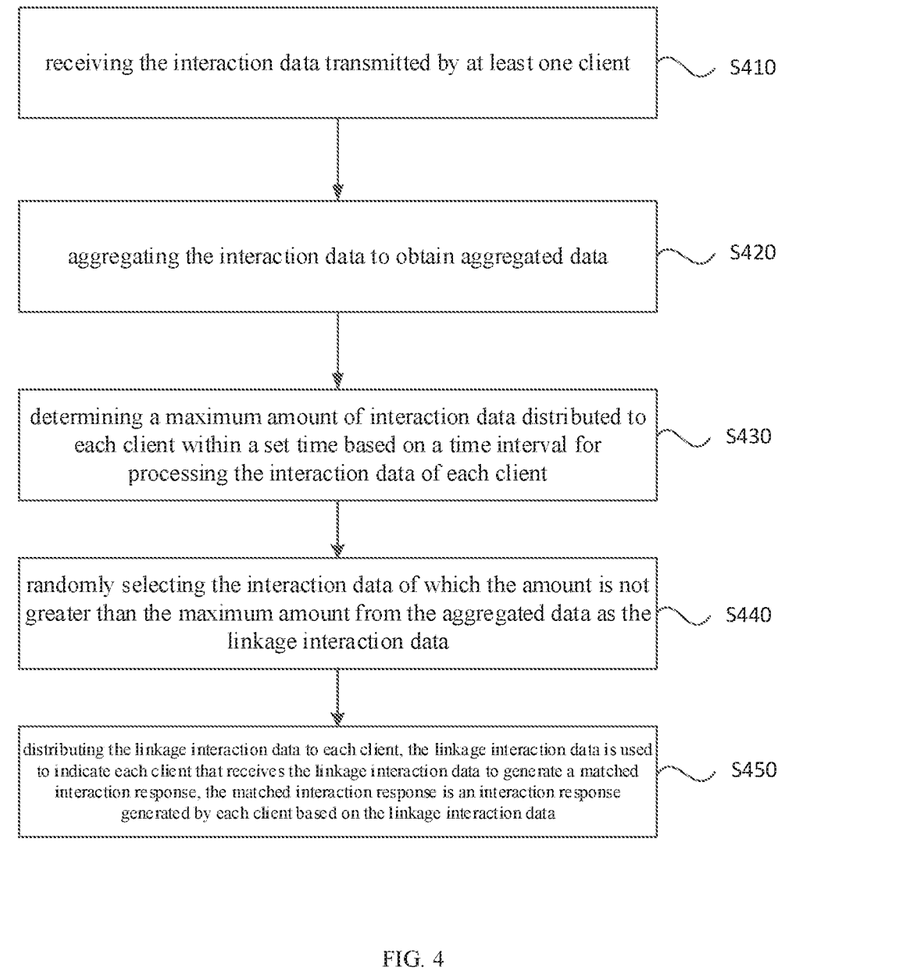
FIG. 4 is a flowchart of an interaction data distribution control method provided by one or more embodiments of the present disclosure.

FIG. 4 is a flowchart of an interaction data distribution method provided by one or more embodiments of the present disclosure. The solution of this embodiment can be combined with various optional solutions in one or more of the above embodiments. In the embodiment, optionally, the selecting the interaction data of which the amount is not greater than the maximum amount from the aggregated data as the linkage interaction data can include:

randomly selecting the interaction data of which the amount is not greater than the maximum amount from the aggregated data as the linkage interaction data.

As shown in FIG. 4, the technical solutions provided by the embodiments of the present disclosure include:

S410: receiving the interaction data transmitted by at least one client.

S420: aggregating the interaction data to obtain aggregated data.

S430: determining a maximum amount of interaction data distributed to each client within a set time based on a time interval for processing the interaction data of each client.

S440: randomly selecting the interaction data of which the amount is not greater than the maximum amount from the aggregated data as the linkage interaction data.

In the embodiment of the present disclosure, the server may aggregate the received interaction data to obtain aggregated data, and may use a random algorithm to randomly select interaction data with amount no more than the maximum amount from the aggregated data as the linkage interaction data, where the maximum amount is a maximum amount of interaction data distributed by the server to each client within the set time.

For example, after the server aggregates the received interaction data, the obtained aggregated data may be $$\begin{bmatrix} Type1 & Count3 \\ Type2 & Count3 \\ Type3 & Count12 \end{bmatrix},$$

and the aggregated data of the interaction data can be expanded as "Type1, Type1, Type1, Type2, Type2, Type2, Type3 . . . Type3", among them, the amount of the interaction data of type3 is 12. Randomly select 6 interaction data from the aggregated data. The selected interaction data can be: "Type1, Type2, Type1, Type3, Type1, Type2".

Therefore, by randomly selecting interaction data with amount no more than the maximum amount from the aggregated data as the linkage interaction data, and distributing it to each client within a set time, instead of selecting according to the order of interaction data, the server can select every type of interaction data as much as possible to ensure that the overall atmosphere of the live broadcast room is consistent with the real situation.

S450: distributing the linkage interaction data to each client. The linkage interaction data is used to indicate each client that receives the linkage interaction data to generate a matched interaction response. The matched interaction response is an interaction response generated by each client based on the linkage interaction data.

Figure 5:
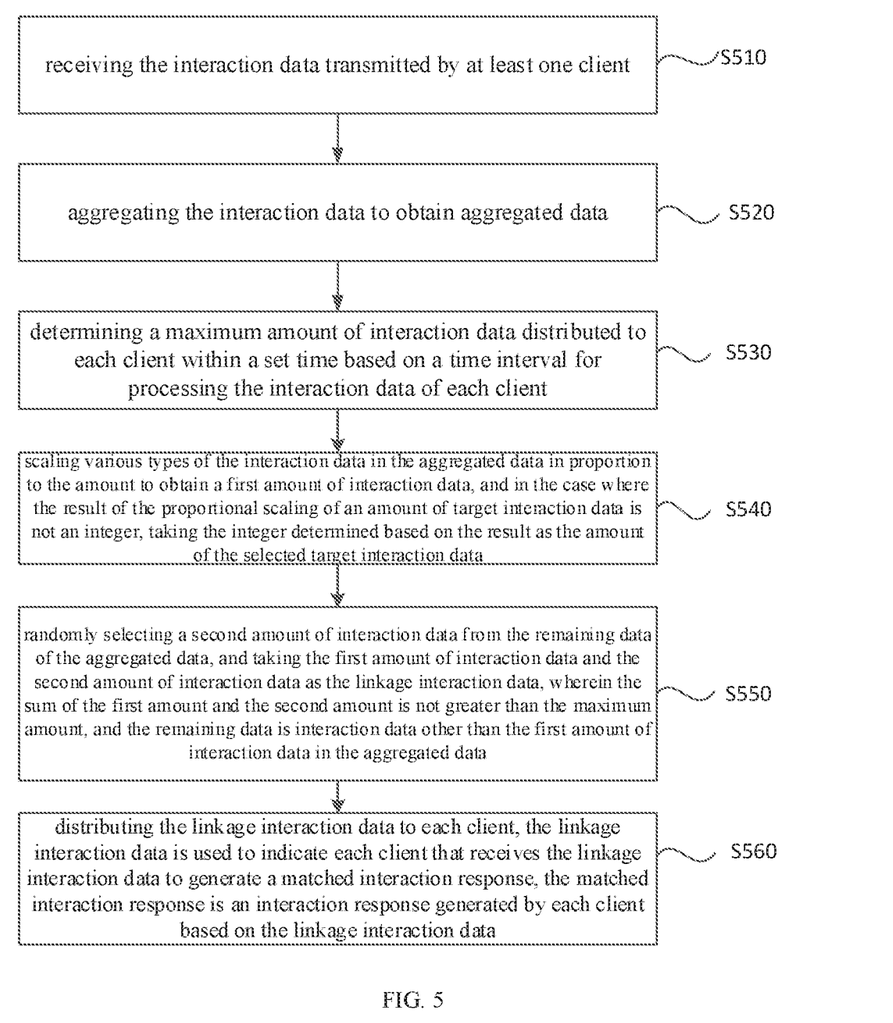
FIG. 5 is a flowchart of an interaction data distribution control method provided by one or more embodiments of the present disclosure.

FIG. 5 is a flowchart of an interaction data distribution method provided by one or more embodiments of the present disclosure. The solutions of this embodiment can be combined with various optional solutions in one or more embodiments described above. In the embodiment, the selecting the interaction data of which the amount is not greater than the maximum amount from the aggregated data as the linkage interaction data can include:

scaling various types of the interaction data in the aggregated data in proportion to the amount to obtain a first amount of interaction data, and in the case where the result of the proportional scaling of an amount of target interaction data is not an integer, taking the integer determined based on the result as the amount of the selected target interaction data;

randomly selecting a second amount of interaction data from the remaining data of the aggregated data, and taking the first amount of interaction data and the second amount of interaction data as the linkage interaction data, wherein the sum of the first amount and the second amount is not greater than the maximum amount, and the remaining data is interaction data other than the first amount of interaction data in the aggregated data.

As shown in FIG. 5, the technical solutions provided by the embodiments of the present disclosure include:

S510: receiving the interaction data transmitted by at least one client.

S520: aggregating the interaction data to obtain aggregated data.

S530: determining a maximum amount of interaction data distributed to each client within a set time based on a time interval for processing the interaction data of each client.

S540: scaling various types of the interaction data in the aggregated data in proportion to the amount to obtain a first amount of interaction data, and in the case where the result of the proportional scaling of an amount of target interaction data is not an integer, taking the integer determined based on the result as the amount of the selected target interaction data.

In the embodiment, the first amount is less than the total amount of interaction data finally selected. In the case where the result of proportional scaling on the amount of interaction data of each type may not be an integer the integer determined based on the proportional scaling result may be used as an amount of interaction data obtained by selecting, wherein the integer determined based on the proportional scaling result may be an integer that rounds up or down the proportional scaling result. For example, if the amount of one piece of interaction data in the aggregated data is 10, and the time of the proportional scaling is 4, the proportional scaling result is rounded down to get 2 as the amount of the interaction data selected.

S550: randomly selecting a second amount of interaction data from the remaining data of the aggregated data, and taking the first amount of interaction data and the second amount of interaction data as the linkage interaction data, wherein the sum of the first amount and the second amount is not greater than the maximum amount, and the remaining data is interaction data other than the first amount of interaction data in the aggregated data.

In the embodiment, when the various types of interaction data in the aggregated data are scaled proportionally according to the amount, in the case where the result of the proportional scaling is not an integer, the integer determined by the proportional scaling result can be used as an interaction data obtained by selecting. Wherein, if the amount of interaction data obtained by proportional scaling and selecting each type of the interaction data according to the amount is less than the maximum amount, then interaction data can be randomly selected again in the remaining data of the aggregated data, enabling the total number of interaction data obtained by two selecting not exceed the maximum amount.

For example, if the aggregated data is $$\begin{bmatrix} Type1 & Count4 \\ Type2 & Count7 \\ Type3 & Count12 \end{bmatrix},$$

the maximum amount of interaction data distributed by the server to each client is 6 in a set time. The server can select 6 interaction data as linkage interaction data and distribute to each client. The total number of interaction data in the aggregated data is 23, and the time of proportional scaling may be 4. The various types of interaction data in the aggregated data are scaled according to the amount. Among them, the number of Type2 is 7, and the integer part (1) of 7/4 is taken as the number of Type2 selected. After Type1 is scaled in proportion to the amount, one Type1 is obtained. After Type3 is scaled in proportion to the amount, three Type3 are obtained. It can be seen that after various types of interaction data are scaled in equal proportions, five interaction data are obtained. Because the server needs to select 6 interaction data as linkage interaction data and distribute them to the client, the server randomly selects one interaction data from the remaining data of the aggregated data, and uses the interaction data obtained after the two selectings as linkage interaction data, and distributes them to each client within a set time. Wherein, the remaining data includes 3 Type1, 6 Type2 and 9 Type3.

Thus, when the various types of interaction data in the aggregated data are scaled proportionally according to the amount, in the case where the result of the proportional scaling is not an integer, and the amount of interaction data obtained by proportional scaling and selecting each type of the interaction data according to the amount is less than the maximum amount, By randomly selecting interaction data in the remaining data, that is, obtaining linkage interaction data through two selectings, the interaction data that matches the real situation of the live broadcast room can be selected to the greatest extent, which ensures that the overall atmosphere of the live broadcast room is consistent with the real situation.

S560: distributing the linkage interaction data to each client. The linkage interaction data is used to indicate each client that receives the linkage interaction data to generate a matched interaction response. The matched interaction response is an interaction response generated by each client based on the linkage interaction data.

Optionally, on the basis of the foregoing embodiment, the method may further include: storing the received interaction data in a database. In one or more embodiments of the present disclosure, the server can store the received interaction data in a database, which can be used for data analysis, and can provide complete and accurate data support for data statistics. Wherein, "storing the received interaction data in a database" may be applied to one or more of the above embodiments.

Figures 6, 7:
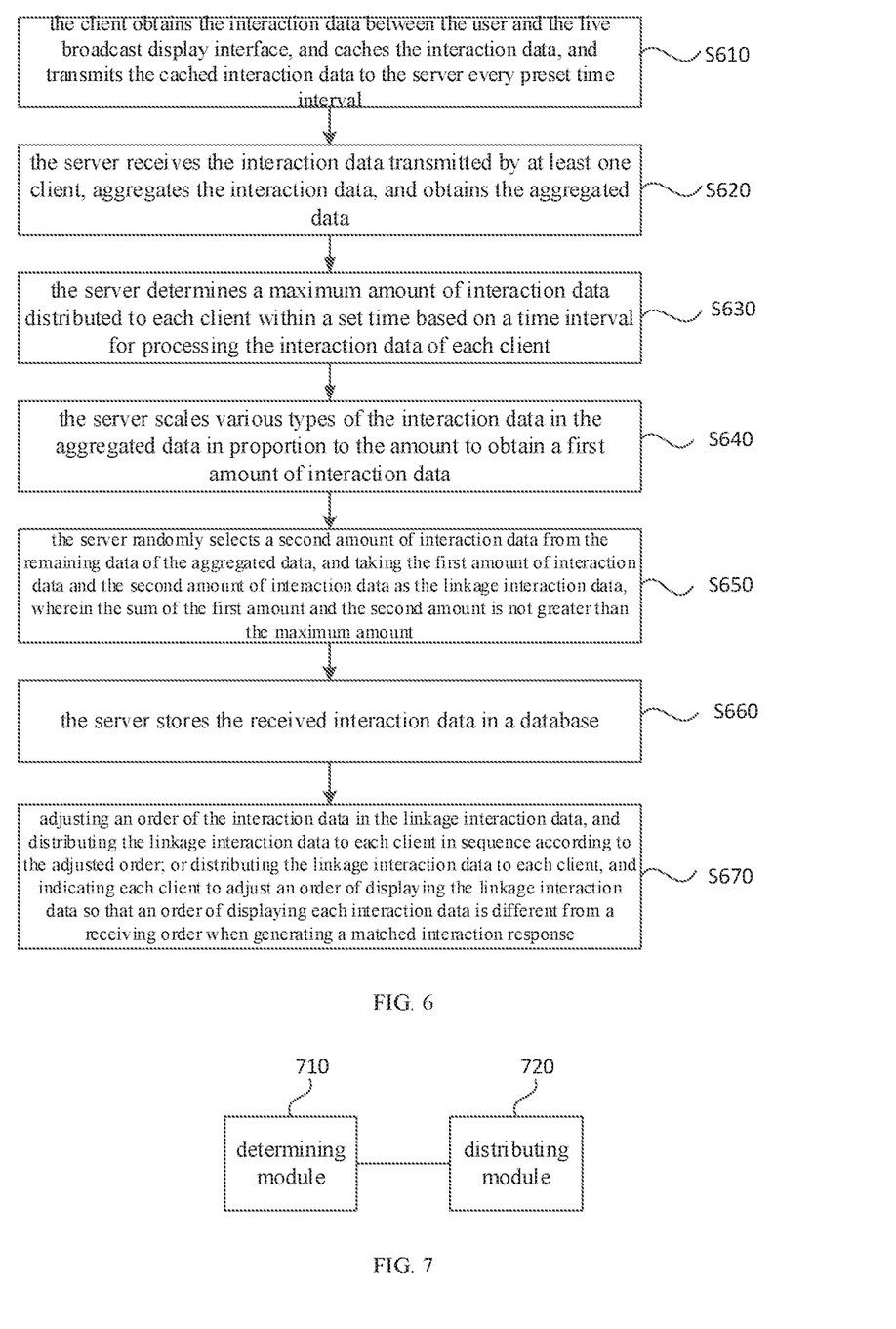
FIG. 6 is a flowchart of an interaction data distribution control method provided by one or more embodiments of the present disclosure.
FIG. 7 is a structural block diagram of an interaction data distribution apparatus provided by one or more embodiments of the present disclosure.

FIG. 6 is a flowchart of an interaction data distribution control method provided by one or more embodiments of the present disclosure, as shown in FIG. 6, the technical solution provided by the embodiment of the present disclosure includes:

S610: The client obtains the interaction data between the user and the live broadcast display interface, and caches the interaction data, and transmits the cached interaction data to the server every preset time interval.

Wherein, the stored interaction data includes a combination of type and amount.

S620: The server receives the interaction data transmitted by at least one client, aggregates the interaction data, and obtains the aggregated data.

S630: The server determines a maximum amount of interaction data distributed to each client within a set time based on a time interval for processing the interaction data of each client.

S640: The server scales various types of the interaction data in the aggregated data in proportion to the amount to obtain a first amount of interaction data.

S650: The server randomly selects a second amount of interaction data from the remaining data of the aggregated data, and taking the first amount of interaction data and the second amount of interaction data as the linkage interaction data, wherein the sum of the first amount and the second amount is not greater than the maximum amount.

S660: The server stores the received interaction data in a database.

S670: adjusting an order of the interaction data in the linkage interaction data, and distributing the linkage interaction data to each client in sequence according to the adjusted order; or distributing the linkage interaction data to each client, and indicating each client to adjust an order of displaying the linkage interaction data so that an order of displaying each interaction data is different from a receiving order when generating a matched interaction response.

In the embodiment of the present disclosure, the format of the interaction data in the linkage data may be: a combination of amount and type, and the order of each type of interaction data in the linkage interaction data is fixed. For example, if the linkage interaction data is $$\begin{bmatrix} Type1 & Count1 \\ Type2 & Count1 \\ Type3 & Count4 \end{bmatrix},$$

the format of each interaction data may be a combination of amount and type. The storage order of Type1, Type2, and Type3 is also fixed, and the order is: Type1, Type2, Type3. When the server distributes the linkage interaction data, if the order of the interaction data in the linkage interaction data is not adjusted, each time the linkage interaction data is distributed, the order of each type of the interaction data in the linkage interaction data is Type1, Type2, Type3. Therefore, it is easy to cause the situation that the client displays the interaction response corresponding to Type 1 first, then the interaction response corresponding to Type 2 and finally the interaction response corresponding to Type 3 each time the client receives the linkage interaction data. That is, it is easy to cause the situation that the client displays the interaction response of each type in the same order each time it receives the linkage interaction data, resulting in the inconsistency between the display of the interaction response and the actual situation in the live broadcast. And if the order of the interaction data in the linkage interaction data is not adjusted, when the amount of a certain type of interaction data in the linkage interaction data is multiple, multiple interaction data of this type are adjacent to each other when they are distributed, which is also easy to cause the situation that the client continuously displays the same interaction response, resulting in inconsistencies between the display of the interaction response and the live broadcast. In one or more embodiments of the present disclosure, by adjusting the order of each interaction data in the linkage interaction data and then distributing them, the client can avoid the problem that each type of interaction response is showed as the same order every time the linkage interaction data is received, can also avoid the phenomenon that the client continuously displays the same interaction response, and can ensure that the display of the interaction response is consistent with that of the live broadcast room.

In the embodiment of the present disclosure, the time interval for client interaction data processing may be 150 milliseconds, and the amount of interaction data distributed by the server to each client per second does not exceed 6. The time interval of client interaction data processing can also be 50 milliseconds, and the amount of interaction data distributed by the server to each client per second does not exceed 20. Thus, by controlling the amount of interaction data distributed within a set time, the accumulation of client interaction data can be avoided, the client can be guaranteed to display the interaction response in real time, and the memory of the client can be saved.

When the user operates the live broadcast display interface, interaction data is generated, and the transmission of the interaction data can be controlled by the client. For example, when each user triggers a control on the live broadcast display interface, within a preset time period, no matter how many times the user triggers the control, the client only transmits the interaction data that the control is lit, or no matter how many times the user triggers a control, the client always transmits only one interaction data that the control is lit, the client always transmits only one interaction data that the control is lit, or the client transmits only one interaction data to the server per unit time. Although the above method greatly saves the resource consumption of the server, it has the following defects: the server cannot accurately determine the overall situation of the interaction in the live broadcast room, and cannot accurately control the time and number of times to trigger the controls on the live broadcast display interface. And because the client only reports the interaction data once per unit time, the type of interaction data generated in the live broadcast room cannot be accurately determined and cannot reflect the real atmosphere in the live broadcast room.

In the technical solution provided by the embodiment, the client stores the generated interaction data and reports it to the server, the server scales the received interaction data of various types in proportion to the amount and controls the amount of interaction data distribution to the client within a set time, which can ensure the accuracy of interaction data statistics under the conditions of high concurrency and strong real-time requirements. As many types of controls are triggered, the true situation of the live broadcast room can be restored as much as possible, and the accurate statistics of interaction data can be ensured without consuming server resources. The server controls the amount of interaction data distributed within the set time, which can save various resources of the client, avoid the accumulation of interaction data by the client, avoid the situation that the client cannot display the interaction response in real time, and ensure the consistency of the overall atmosphere in the live broadcast room.

FIG. 7 is a structural block diagram of an interaction data distribution apparatus provided by one or more embodiments of the present disclosure. As shown in FIG. 7, the apparatus provided by the embodiment of the present disclosure includes: a determining module 710 and a distributing module 720.

The determining module 710 determines a maximum amount of interaction data distributed to each client within a set time based on a time interval for processing the interaction data of each client, wherein the interaction data is data that a user interacts with a live broadcast display interface of the client.

The distributing module 720 distributes linkage interaction data to each client, wherein the linkage interaction data is used to indicate each client that receives the linkage interaction data to generate a matched interaction response, and the linkage interaction data is not greater than the maximum amount of the interaction data, and the matched interaction response is an interaction response generated by each client based on the linkage interaction data.

Optionally, the determining module 710 may further determine the maximum amount based on the following formula:

$$N_{max} \leq \frac{S}{\Delta T}$$

Wherein, $N_{max}$ is the maximum amount; S is the set time; $\Delta T$ is the time interval.

Optionally, the apparatus further includes:
a receiving module configured to receive interaction data transmitted by at least one client;
an aggregating module configured to aggregate the interaction data to obtain the aggregated data:
a selecting module configured to select the interaction data of which the amount is not greater than the maximum amount from the aggregated data as the linkage interaction data.

Optionally, the selecting module may further scale various types of the interaction data in the aggregated data in proportion to the amount to obtain the linkage interaction data, wherein the amount of the interaction data in the linkage interaction data is not greater than the maximum amount.

Optionally, the selecting module may further randomly select the interaction data of which the amount is not greater than the maximum amount from the aggregated data as the linkage interaction data.

Optionally, the selecting module may further scale various types of the interaction data in the aggregated data in proportion to the amount to obtain a first amount of interaction data, and in the case where the result of the proportional scaling of an amount of target interaction data is not an integer, taking the integer determined based on the result as the amount of the selected target interaction data.

Optionally, the selecting module may further randomly select a second amount of interaction data from the remaining data of the aggregated data, and taking the first amount of interaction data and the second amount of interaction data as the linkage interaction data, wherein the sum of the first amount and the second amount is not greater than the maximum amount, and the remaining data is interaction data other than the first amount of interaction data in the aggregated data.

The apparatus further includes a storage module that stores the received interaction data in a database.

Optionally, the interaction response is an animation.

The apparatus further includes a receiving module that can receive the interaction data transmitted by the client per a preset interval, wherein the interaction data is data cached by the client and of the user interacting with the live broadcast display interface.

The above-mentioned apparatus can execute the method provided by any embodiment of the present disclosure, and has functional modules and beneficial effects for executing the method.

Figure 8:
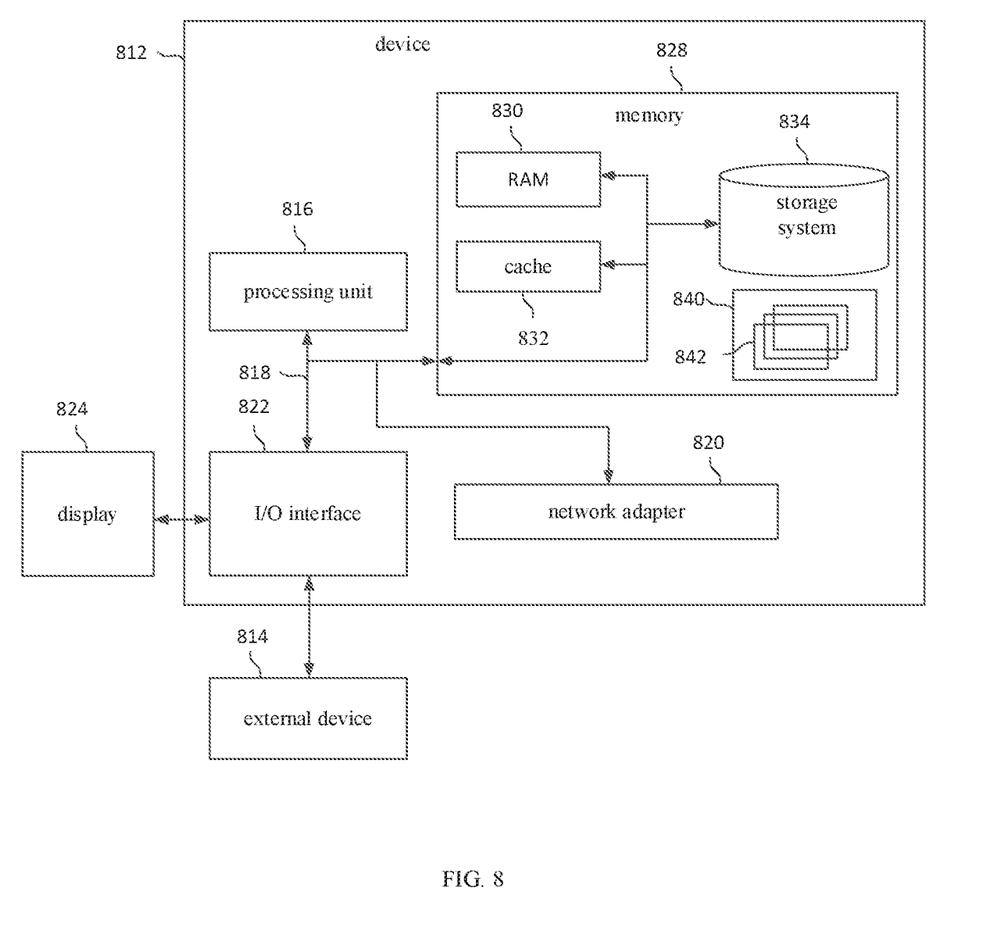
FIG. 8 is a schematic structural diagram of an electronic device provided by one or more embodiments of the present disclosure.

FIG. 8 is a schematic structural diagram of an electronic device provided by one or more embodiments of the present disclosure. FIG. 8 shows a block diagram of an exemplary electronic device 812 suitable for implementing embodiments of the present disclosure. The electronic device 812 shown in FIG. 8 is only an example, and should no any limitation to the functions and use scope of the embodiments of the present disclosure.

As shown in FIG. 8, the electronic device 812 is represented in the form of a general-purpose computing device. Components of the electronic device 812 may include, but are not limited to, one or more processors or processing units 816, system memory 828, and a bus 818 connecting different system components (including system memory 828 and processing unit 816).

The bus 818 represents one or more of several types of bus structures, including a memory bus or a memory controller, a peripheral bus, a graphics acceleration port, a processor, or a local bus using any of a variety of bus structures. For example, these architectures include, but are not limited to, industry standard architecture (ISA) bus, microchannel architecture (MAC) bus, enhanced ISA bus, Video Electronics Standards Association (VESA) local bus, and peripheral component interconnection (PCI) bus.

The device 812 typically includes a variety of computer system readable media. These media may be any available media that can be accessed by the device 812, including volatile and nonvolatile media, removable and non-removable media.

System memory 828 may include computer system readable media in the form of volatile memory, such as random access memory (RAM) 830 and/or cache memory 832. The device 812 may further include other removable/non-removable, volatile/nonvolatile computer system storage media. Merely by way of example, the storage system 834 can be used to read and write non-removable, non-volatile magnetic media (not shown in FIG. 8 and is commonly referred to as a "hard disk drive"). Although not shown in FIG. 8, a disk drive for reading and writing to a removable non-volatile disk (e.g., "floppy disk"), and an optical disc drive for reading and writing removable non-volatile optical discs (such as CD-ROM, DVD-ROM or other optical media) may be provided. In these cases, each drive may be connected to the bus 818 through one or more data media interfaces. The memory 828 may include at least one program product having a set (e.g., at least one) of program modules that are configured to perform the functions of various embodiments of the present disclosure.

A program/utility tool 840 having a set of (at least one) program modules 842, which may be stored in, for example, the memory 828, such program modules 842 include, but are not limited to, an operating system, one or more application programs, and other programs modules and program data, each or some combination of these examples may include the implementation of the network environment. The program module 842 generally performs the functions and/or methods in the embodiments described in the present disclosure.

The device 812 may also communicate with one or more external devices 814 (e.g., keyboard, pointing device, display 824, etc.), and may also communicate with one or more devices that enable a user to interact with the device 812, and/or may communicate with any device (such as a network card, modem, etc.) that enables the device 812 to communicate with one or more other computing devices. This communication can be performed via an input/output (110) interface 822. Moreover, the device 812 can also communicate with one or more networks (such as a local area network (LAN), a wide area network (WAN), and/or a public network, such as the Internet) through the network adapter 820. As shown, the network adapter 820 communicates with other modules of the device 812 via the bus 818. It should be understood that although not shown in FIG. 8, other hardware and/or software modules may be used in conjunction with the device 812, including but not limited to: microcode, device drivers, redundant processing units, external disk drive arrays, RAID systems, tape driver and data backup storage system.

The processing unit 816 executes programs stored in the system memory 828 to execute various functional applications and data processing, for example, to implement the interaction data distribution control method provided by the embodiments of the present disclosure.

An embodiment of the present disclosure provides a computer-readable storage medium on which a computer program is stored, and when the program is executed by a processor, an interaction data distribution control method as provided by one or more embodiments of the present disclosure is implemented.

Any combination of one or more computer-readable media may be used. The computer-readable medium may be a computer-readable signal medium or a computer-readable storage medium. The computer-readable storage medium may be, for example, but not limited to, an electrical, magnetic, optical, electromagnetic, infrared, or semiconductor system, apparatus or device, or any combination of the above. More specific examples (non-exhaustive list) of computer readable storage media include: electrically connected, portable computer disk with one or more wires, hard disks, random access memory (RAM), read only memory (ROM), erasable programmable read-only memory (EPROM or flash memory), optical fiber, portable compact disk read-only memory, optical storage device, magnetic storage device, or any suitable combination of the foregoing. In this document, the computer-readable storage medium may be any tangible medium that contains or stores a program, and the program may be used by or in combination with an instruction execution system, apparatus, or device.

The computer-readable signal medium may include a data signal that is propagated in baseband or as part of a carrier wave, in which computer-readable program code is carried. This propagated data signal can take many forms, including but not limited to electromagnetic signals, optical signals, or any suitable combination of the above. The computer-readable signal medium may also be any computer-readable medium other than a computer-readable storage medium, which may send, propagate, or transmit a program for use by or in combination with an instruction execution system, apparatus, or device.

The program code included in the computer-readable medium may be transmitted using any appropriate medium, including but not limited to wireless, wire, optical fiber cable, RF, etc., or any suitable combination of the foregoing.

The computer program code for performing the operations of the present disclosure can be written in one or more programming languages or a combination thereof. The programming languages include object-oriented programming languages such as Java, Smalltalk, C++, and conventional procedural programming language-such as "C" language or similar programming language. The program code may be executed entirely on the user's computer, partly on the user's computer, as an independent software package, partly on the user's computer and partly on a remote computer, or entirely on the remote computer or server. In situations involving remote computers, the remote computer may be connected to the user's computer through any kind of network, including a local area network (LAN) or a wide area network (WAN), or it may be connected to an external computer (for example, via the internet of an Internet service provider).

It is noted that the above are only the preferred embodiments of the present disclosure and the technical principles applied. Those skilled in the art will understand that the present disclosure is not limited to the specific embodiments described herein, and that various obvious changes, readjustments, and substitutions can be made by those skilled in the art without departing from the scope of protection of the present disclosure. Therefore, although the present disclosure has been described in more detail through the above embodiments, the present disclosure is not limited to the above embodiments, and other equivalent embodiments may be included without departing from the concept of the present disclosure, and the scope of the present disclosure is determined by the scope of the appended claims.

What is claimed is:

1. A method for distributing interaction data, comprising:
receiving interaction data from at least one client among a plurality of clients, wherein the interaction data is generated by the at least one client upon receiving user interaction information via a live broadcast display interface of the at least one client, at least one interaction response corresponding to the interaction data is generated and displayed by the at least one client, and the interaction data comprise information indicative of a type of user interaction and information indicative of an amount of user interaction in each type of user interaction;
determining a maximum amount of user interaction to be distributed to each of the plurality of clients within a predetermined period of time based on a time for processing the interaction data by the at least one client, wherein the time for processing the interaction data is associated with generating and displaying the at least one interaction response by the at least one client;
distributing data to each of the plurality of clients, wherein at least one matched interaction response is generated and displayed by other clients than the at least one client based on the data, the data correspond to a number of user interaction that is not greater than the maximum amount of user interaction; and
wherein the maximum amount of user interaction is determined based on a formula $$N_{max} \leq \frac{S}{\Delta T},$$

wherein $N_{max}$ represents the maximum amount of user interaction to be distributed to each of the plurality of clients, S represents the predetermined period of time, and $\Delta T$ represents the time for processing the interaction data by the at least one client.

2. The method of claim 1, further comprising:
aggregating the interaction data to obtain aggregated data; and
selecting the data for distributing to each of the plurality of clients from the aggregated data.

3. The method of claim 2, wherein the selecting the data for distributing to each of the plurality of clients from the aggregated data further comprises:
scaling each type of user interaction in the aggregated data in proportion.

4. The method of claim 2, wherein the selecting the data for distributing to each of the plurality of clients from the aggregated data further comprises:
randomly selecting the data from the aggregated data based on determining that the number of user interaction in the data is not greater than the maximum amount of user interaction.

5. The method of claim 2, wherein the selecting the data for distributing to each of the plurality of clients from the aggregated data further comprises:
scaling each type of user interaction in the aggregated data in proportion obtain a first amount of user interaction, and when a result of the scaling is not an integer, taking the integer determined based on the result as the first amount of user interaction;
randomly selecting a second amount of user interaction from remaining data of the aggregated data, and taking the first amount of user interaction and the second amount of user interaction as the number of user interaction in the selected data, wherein a sum of the first amount and the second amount is not greater than the maximum amount of user interaction to be distributed to each of the plurality of clients.

6. The method of claim 1, further comprising:
receiving the interaction data from the at least one client per a preset interval, wherein the interaction data were cached by the at least one client.

7. The method of claim 1, wherein the distributing the data to each of the plurality of clients further comprises:
adjusting an order of the user interactions in the data, and distributing the data to each of the plurality of clients in sequence according to the adjusted order; or
distributing the data to each of the plurality of clients, and the data comprising information indicating each of the plurality of clients to adjust an order of generating and displaying matched interaction responses so that the order of generating and displaying the matched interaction responses is different from an order of receiving data corresponding to each of the matched interaction responses.

8. The method of claim 1, wherein there are a plurality of types of user interaction performed by a user via the live broadcast display interface, and the live broadcast display interface comprises a plurality of control elements corresponding to the plurality of types of user interaction.

9. The method of claim 8, wherein the interaction data is cached by the at least one client, and the amount of user interaction in each type of user interaction is increased by one based on determining that a same type of user interaction has already been included in a cache area of the at least one client.

10. The method of claim 8, wherein the at least one interaction response generated and displayed by the at least one client corresponds to the at least one matched interaction response generated and displayed by other clients, and the at least one interaction response comprises a plurality of interaction responses corresponding to a plurality of user interaction performed by user via the live broadcast display interface.

11. An electronic device, comprising:
one or more processors;
a storage storing one or more programs,
when the one or more programs are executed by the one or more processors, the one or more processors are caused to implement operations, the operation comprising:
receiving interaction data from at least one client among a plurality of clients, wherein the interaction data is generated by the at least one client upon receiving user interaction information via a live broadcast display interface of the at least one client, at least one interaction response corresponding to the interaction data is generated and displayed by the at least one client, and the interaction data comprise information indicative of a type of user interaction and information indicative of an amount of user interaction in each type of user interaction;

determining a maximum amount of user interaction to be distributed to each of the plurality of clients within a predetermined period of time based on a time for processing the interaction data by the at least one client, wherein the time for processing the interaction data is associated with generating and displaying the at least one interaction response by the at least one client;

distributing data to each of the plurality of clients, wherein at least one matched interaction response is generated and displayed by other clients than the at least one client based on the data, the data correspond to a number of user interaction that is not greater than the maximum amount of user interaction; and wherein the maximum amount of user interaction is determined based on a formula $$N_{max} \leq \frac{S}{\Delta T},$$

wherein $N_{max}$ represents the maximum amount of user interaction to be distributed to each of the plurality of clients, S represents the predetermined period of time, and $\Delta T$ represents the time for processing the interaction data by the at least one client.

12. The electronic device of claim 11, wherein there are a plurality of types of user interaction performed by a user via the live broadcast display interface, and the live broadcast display interface comprises a plurality of control elements corresponding to the plurality of types of user interaction.

13. A non-transitory computer-readable storage medium on which a computer program is stored, wherein when the computer program is executed by a processor, it causes to implement operations comprising:

receiving interaction data from at least one client among a plurality of clients, wherein the interaction data is generated by the at least one client upon receiving user interaction information via a live broadcast display interface of the at least one client, at least one interaction response corresponding to the interaction data is generated and displayed by the at least one client, and the interaction data comprise information indicative of a type of user interaction and information indicative of an amount of user interaction in each type of user interaction;

determining a maximum amount of user interaction to be distributed to each of the plurality of clients within a predetermined period of time based on a time for processing the interaction data by the at least one client, wherein the time for processing the interaction data is associated with generating and displaying the at least one interaction response by the at least one client;

distributing data to each of the plurality of clients, wherein at least one matched interaction response is generated and displayed by other clients than the at least one client based on the data, the data correspond to a number of user interaction that is not greater than the maximum amount of user interaction; and wherein the maximum amount of user interaction is determined based on a formula $$N_{max} \leq \frac{S}{\Delta T},$$

wherein $N_{max}$ represents the maximum amount of user interaction to be distributed to each of the plurality of clients, S represents the predetermined period of time, and $\Delta T$ represents the time for processing the interaction data by the at least one client.

14. The non-transitory computer-readable storage medium of claim 13, the operations further comprising:

aggregating the interaction data to obtain aggregated data; and selecting the data for distributing to each of the plurality of clients from the aggregated data.

15. The non-transitory computer-readable storage medium of claim 14, wherein the selecting the data for distributing to each of the plurality of clients from the aggregated data further comprises:

scaling each type of user interaction in the aggregated data in proportion.

16. The non-transitory computer-readable storage medium of claim 14, wherein the selecting the interaction data of which the amount is not greater than the maximum amount from the aggregated data as the linkage interaction data, comprising:

randomly selecting the data from the aggregated data based on determining that the number of user interaction in the data is not greater than the maximum amount of user interaction.

17. The non-transitory computer-readable storage medium of claim 13, the operations further comprising:

receiving the interaction data from the at least one client per a preset interval, wherein the interaction data were cached by the at least one client.

18. The non-transitory computer-readable storage medium of claim 13, the distributing the data to each of the plurality of clients further comprises:

adjusting an order of the user interaction in the data, and distributing the data to each of the plurality of clients in sequence according to the adjusted order; or distributing the data to each of the plurality of clients, and the data comprising information indicating each of the plurality of clients to adjust an order of generating and displaying matched interaction responses so that the order of generating and displaying the matched interaction responses is different from an order of receiving data corresponding to each of the matched interaction responses.

* * * * *